July 15, 1924.
R. DECOUX
1,501,705
CHANGE SPEED APPARATUS
Filed June 8, 1920
2 Sheets-Sheet 1
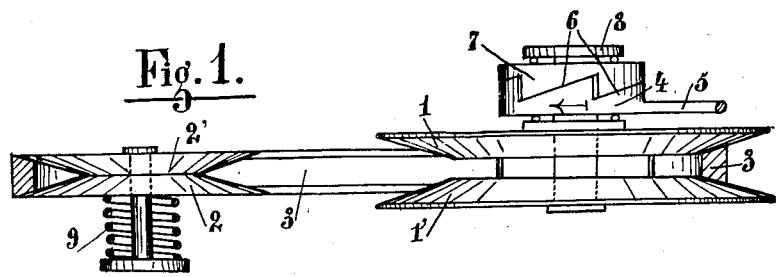
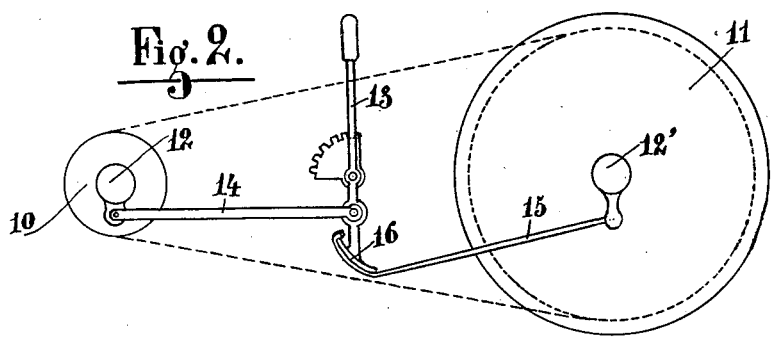
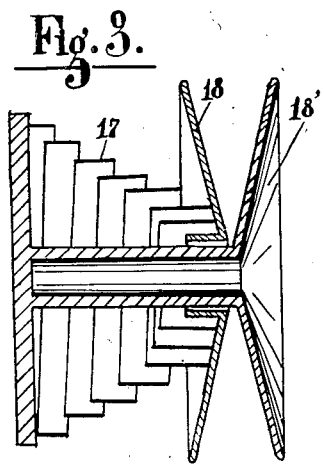
INVENTOR:-
Robert Decoux
By his Attorneys:-

July 15, 1924.

R. DECOUX 1,501,705

CHANGE SPEED APPARATUS

Filed June 8, 1920   2 Sheets-Sheet 2

INVENTOR
ROBERT DECOUX
BY Richards & Geier
ATTORNEYS

Patented July 15, 1924.

1,501,705

UNITED STATES PATENT OFFICE.

ROBERT DECOUX, OF CENEY, BELGIUM.

CHANGE-SPEED APPARATUS.

Application filed June 8, 1920. Serial No. 387,410.

*To all whom it may concern:*

Be it known that I, ROBERT DECOUX, a citizen of the Kingdom of Belgium, and resident of Ceney, Province de Namur, Belgium, have invented certain new and useful Improvements in Change-Speed Apparatus, and on which I have filed applications for patent in Belgium on June 6th, 1919, No. 224,949, issued July 15, 1919, No. 280,678; England, July 12th, 1920, No. 21,010, issued on January 12th, 1922, No. 173,798; France, July 8th, 1920, No. 130,433, issued on February 2nd, 1921, No. 519,775; and Germany, July 10th, 1920, No. 37,992; and I do hereby declare the following to be a full, clear, and exact description of the invention, such as will enable others skilled in the art to which it appertains to make and use the same, reference being had to the accompanying drawings, and to letters or figures of reference marked therein, which form a part of this specification.

This invention relates to power transmission apparatus operated by means of flexible members such as belts, ropes, etc., of the type wherein the variation of the speed of the power transmissions is effected by varying the operative diameter of one pulley or of both pulleys.

The suitable tension to be given to the flexible member is produced in apparatus of this type by varying the operative diameter of the other pulley, or by shifting this second pulley relatively to the first pulley, or again by the use of a tensioning pulley or any other tensioning means.

The present invention has for its object to provide an improved apparatus of this type wherein the adjustment of the tension of the flexible member is produced automatically on the actuation of the mechanism for varying the speed of transmission.

In transmitting mechanisms of the type above specified, it has heretofore been proposed to maintain the tension of the flexible member constant for different speeds. The subject matter of the present invention is based on the principle, that the tension should not remain constant, but on the contrary, should vary, and be kept always proportionate to the different conditions of working. For instance it will be readily understood that the tension of the flexible member should at all speeds be inversely proportional to the operative diameter of the driving pulley so that the tension shall be greater when a greater tangential force is transmitted by a smaller diameter of the pulley.

The above remarks are corroborated by practice which teaches that in the known transmission apparatus operating with constant tension, the tension is not sufficient when the flexible member is acting upon the small diameter of the driving pulley, with the result that there is a more or less considerable amount of slip with consequent loss of power, increased wear and heating injurious to the parts of the mechanism. On the other hand when the flexible member is revolving at a high speed on the large diameter of the driving pulley, an excess of tension is produced which is a strain on the motor, deprives it of all flexibility, and is injurious to the flexible member.

Those drawbacks are obviated according to the present invention by the fact that on a demand taking place for a variation in the speed, the tension of the flexible member is automatically rendered proportionate to the conditions of working.

This result may be obtained for instance by providing between the mechanism for controlling the variation of the speed and the mechanism for varying the tension, a suitable connecting device that will cause the tension to vary in determined proportions in accordance with the varying conditions.

The desired result may also be attained by controlling directly only the mechanism for varying the speed, and in producing tension by means of a spring. This spring which effects the regulation of the tension, may be applied for example to a tensioning pulley or to an apparatus for varying the diameter of one of the pulleys or to an apparatus varying the distance between the two pulleys.

The tension proportioned according to the present invention prevents the flexible member from slipping, and obviates excess of strain on the said member and on the parts of the transmitting apparatus, whilst it also allows of reducing the losses due to the stiffness of the flexible members, which losses are greater, the greater the tension of the flexible member; it also allows of reducing the losses due to lateral friction arising in cases of an excessive tensioning of the flexible member working in grooved pulleys and also of diminishing the friction in the bearings.

The advantages of constructions wherein a spring is employed, consist in the fact that the spring compensates automatically in accidental cases of variations in the length of the flexible member, and the shifting of the latter due to accessory causes.

Another advantage of the spring consists in the fact that it gives automatically the excess of tension rendered necessary because of the centrifugal force, whatever the angular velocity of the driving pulley may be.

The accompanying drawings illustrate by way of example various apparatus suitable for use for carrying the present invention into effect.

Fig. 1 illustrates a transmission apparatus comprising a driving belt of trapezoidal cross section, and pulleys having adjustable cheeks, one of these pulleys being driven whilst the other is subjected to the action of a spring.

Fig. 2 illustrates a similar transmission apparatus with simultaneous adjustment of the two pulleys.

Fig. 3 shows a modified form of pulley.

Figure 4:
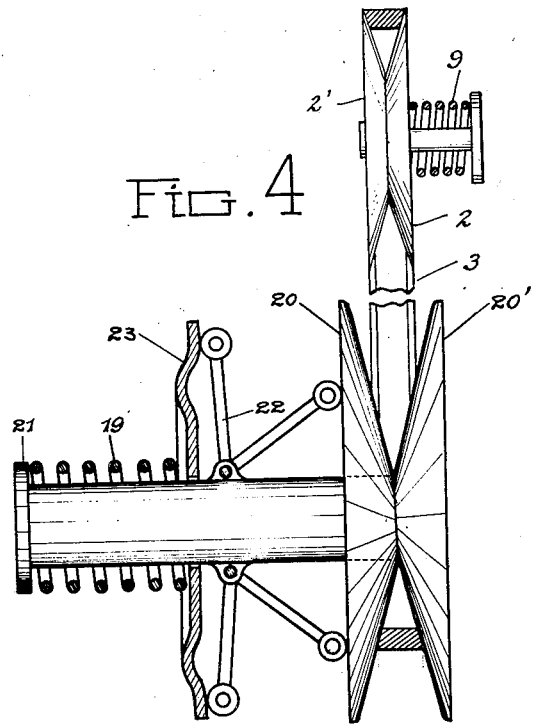
Fig. 4 is a view similar to Fig. 1, showing a further modification of one of the pulleys shown in the position of its maximum operative diameter.
Figure 5:
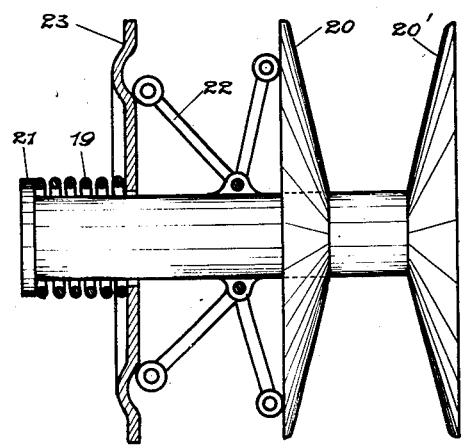
Fig. 5 is a part sectional view of the modified pulley shown in Fig. 4, showing the pulley in the position of minimum operative diameter.

In the constructional forms shown in Fig. 1 each pulley consists of two halves or cheeks 1, 1' and 2, 2' respectively, the first one (1 or 2) of which is fixed, and the other cheek (1' or 2') is capable of being moved away from or nearer to the first cheek, whilst it likewise is being rotated. The trapezoidal belt 3 is pressed towards the cheeks of the pulleys.

In order to vary the speed, the pulley 1, 1' is acted upon by means of a "quick pitch" apparatus comprising a disc 4 operated by a lever 5 bearing against the fixed cheek 1 through the medium of a ball thrust bearing. This disc 4 is formed with helical surfaces 6 of quick pitch which are in contact with corresponding surfaces of a disc 7 acting through the medium of a ball thrust bearing upon a plate 8 fixed to the cheek 1'. The disc 4 is at liberty to revolve freely, whereas the disc 7 is guided in such a manner as to allow of the latter slipping without revolving, so that on turning the disc 4 in the direction of the arrow, the disc 7 will be shifted, and thereby the two cheeks 1 and 1' will be brought nearer together.

When the disc 4 is turned in the reverse direction, the tension of the belt will automatically move the cheek 1' away from the cheek 1. Upon the pulley 2, 2' there is mounted a spring 9 which has a constant tendency to move the movable cheek 2' towards the fixed cheek 2, and thereby keep the belt in tension.

According to the present invention this spring 9 is so made as to give to the belt always a tension that is proportionate to the working conditions. This is effected more particularly by means hereinafter described.

Fig. 2 illustrates an arrangement in which the two pulleys 10 and 11 which are constructed in two halves like those shown in Fig. 1, are controlled respectively by quick pitch mechanism 12 and 12' similar to the mechanism above described with reference to the pulley 1, 1'. A single operating lever 13 is connected by a connecting rod 14 to the mechanism 12 of the pulley 10 and by a rope 15 to the mechanism 12' of the pulley 11. This rope 15 passes round a cam 16 provided on the end of the operating lever 13 and is fixed to the end of said cam. By operating the lever 13, the cheeks of one of the pulleys can be made to move nearer to each other, whilst simultaneously the cheeks of the other pulley are caused to move away from each other.

But the suitable shape given to the cam 16 allows of establishing between the shifting movements of the cheeks of the two pulleys a determined relation according to the present invention.

When springs are employed with one of the pulleys or with the mechanism for producing the tension of the belt it is advantageous for the purpose of producing the conditions forming the object of the present invention, to arrange matters so that the action exerted by the spring will vary in a manner that is not proportionate to the degree of compression of the spring. These results may be produced as shown in Fig. 3 by means of a conical coiled spring 17 acting at one end upon a cheek 18 of the pulley and at its other end upon a plate fixed to the other cheek 18' of the same pulley.

When the spring is compressed, the turns of the spring bear successively against the cheek 18, thus diminishing the operative length of the spring. The action of the spring may also be varied at the same time by making the spring strip of diminishing height, or shaping the plate in such a manner as to vary the bearing point of the spring. If the spring is placed, for instance, against the driven pulley, the action of the spring must diminish when the operative diameter of the driven pulley diminishes by reason of the increase in the operative diameter of the driving pulley. In such a case use should be made of the arrangement shown in Fig. 4, where an ordinary coiled spring 19 acts upon the movable cheek 20 of a pulley through the medium of a plate 21 and bell crank levers 22 whose ends bear on the one hand against the cheek 20 and on the other hand against the plate 23. Owing to the variation in the leverage of the action of the spring, the thrust exerted by the spring against the cheek 20 is not proportionate to the extent of the shifting movement of the said cheek.

What I claim is:

1. A change speed apparatus comprising a drive and a driven pulley, a flexible power transmitting member led over said pulleys, means for varying the operative diameters of the pulleys, and means for automatically varying the tension of the said flexible member in accordance with the working conditions.

2. A change speed apparatus comprising a drive and a driven pulley, comprising elements relatively axially movable to vary the operative diameters of the pulleys, a belt looped over said pulleys, a spring bearing on one of said pulley elements, and means interposed between said spring and said pulley element adapted to automatically increase the pressure of said element on the belt as the operative diameter of the drive pulley decreases.

3. A change speed apparatus comprising a drive and a driven pulley, comprising elements relatively axially movable to vary the operative diameters of the pulleys, a belt looped over said pulleys, a spring bearing on one of said pulley elements, and means interposed between said spring and said pulley element adapted to automatically increase the pressure of said element on the belt as the operative diameter of the drive pulley decreases, said means including a bell crank lever having one arm engaging the said pulley element and its other arm in operative relation to the said spring.

4. A change speed apparatus, comprising a drive and a driven pulley, a flexible power transmitting member led over said pulleys, means for varying the operative diameters of the pulleys, and means for automatically varying the tension of the said flexible member in accordance with the working conditions, said means including a spring, and a differential leverage device actuated by said spring.

5. A change speed apparatus comprising a drive and a driven pulley, a flexible power transmission member led over said pulleys, means for varying the operative diameters of said pulleys, and means independent of said speed varying means for automatically varying the tension of the said flexible member in inverse ratio to the variation in diameter of the drive pulley.

6. Change speed apparatus comprising a drive and a driven pulley, a flexible power transmission member led over said pulleys, means for varying the operative diameters of said pulleys, and means combined with said speed varying means for automatically varying the tension of said flexible member, in accordance with the working conditions.

In testimony whereof I affix my signature in presence of two witnesses.

ROBERT DECOUX.

Witnesses:
GEORGES VANDER HAEGHEN,
LEONARD LEIRA.